Jan. 12, 1954    J. FRASER    2,665,926
COUPLING DEVICE FOR PIPES OR CONDUITS
Filed March 6, 1951    5 Sheets-Sheet 1

INVENTOR
John Fraser
BY
ATTORNEY

Jan. 12, 1954
J. FRASER
2,665,926
COUPLING DEVICE FOR PIPES OR CONDUITS
Filed March 6, 1951
5 Sheets-Sheet 2
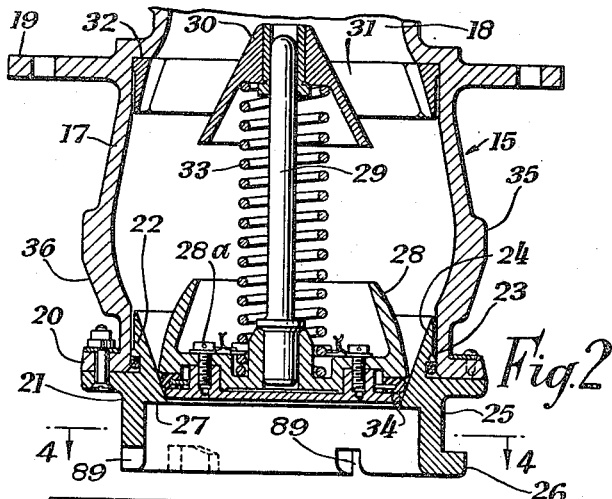
Fig.2
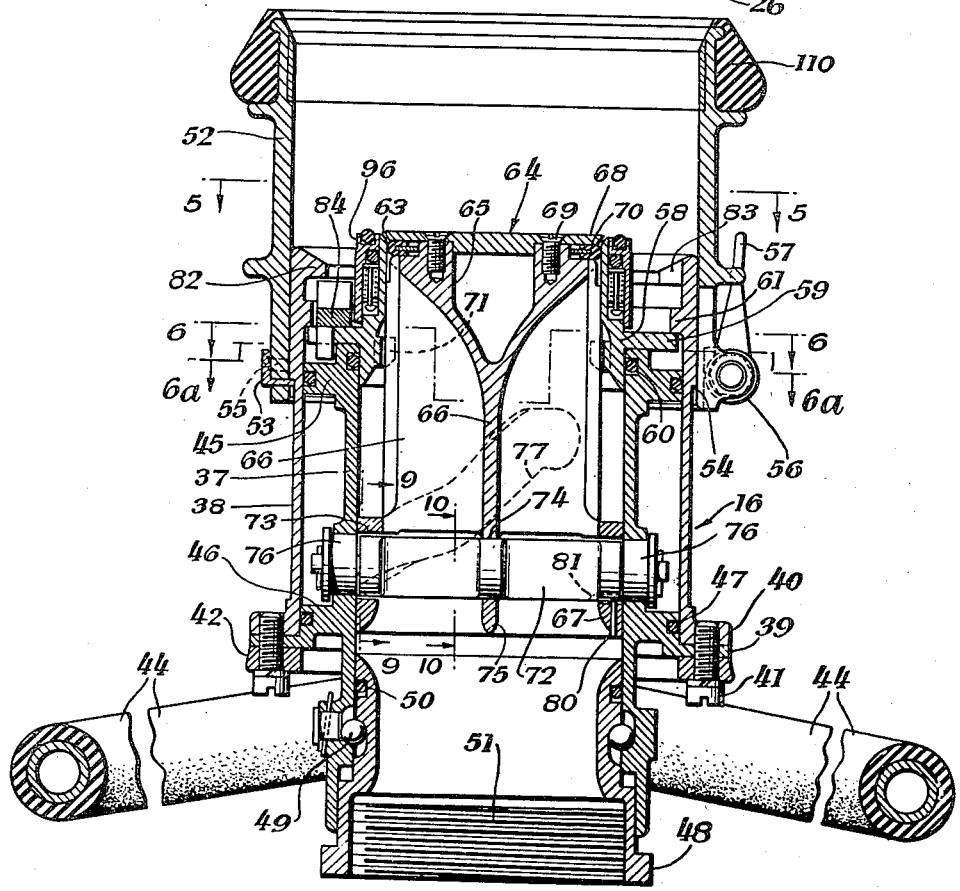
INVENTOR
John Fraser
BY
ATTORNEY Jan. 12, 1954        J. FRASER        2,665,926
COUPLING DEVICE FOR PIPES OR CONDUITS
Filed March 6, 1951        5 Sheets-Sheet 4

INVENTOR
John Fraser
BY
ATTORNEY

Jan. 12, 1954 J. FRASER 2,665,926
COUPLING DEVICE FOR PIPES OR CONDUITS
Filed March 6, 1951 5 Sheets-Sheet 5

INVENTOR
John Fraser
BY
ATTORNEY

Patented Jan. 12, 1954

2,665,926

UNITED STATES PATENT OFFICE 2,665,926

COUPLING DEVICE FOR PIPES
OR CONDUITS

John Fraser, Tolworth, England, assignor to
Avery-Hardoll Limited, Tolworth, England Application March 6, 1951, Serial No. 214,100

7 Claims. (Cl. 284—18)

This invention relates to coupling devices for pipes or conduits, of the kind in which first and second coupling parts are provided respectively with first and second valve members which close the passages through the respective coupling parts when those parts are separated.

The main object of the present invention is to provide a coupling device in which the interengagement of the coupling members and the opening of the valves can be rapidly effected in a single operation and without the expenditure of great effort.

Further objects of the invention are to provide a coupling which causes only a small pressure drop in the fluid flowing through it, and which allows very little spillage of fluid during coupling and uncoupling.

According to the invention, in a coupling of the kind referred to the coupling parts are interengaged by turning movement of one with respect to the other, the second valve member being automatically coupled with the first coupling part when the coupling parts are brought together so that the relative turning movement of the coupling parts for interengaging them is accompanied by turning of the said second valve member relative to the second coupling part, cam and follower mechanism being provided between the said second valve member and the second coupling part to produce axial movement of the said second valve member into the first coupling part during such relative turning movement, whereby said second valve member engages the first valve member and displaces it from its seat.

Further, according to the invention, a coupling device of the kind referred to in which the second valve member, during its opening movement, enters the first coupling part and displaces the first valve member, is characterized in that cam and follower mechanism is interposed between the second valve member and the second coupling part to effect axial movement of the said valve member during relative rotation of said valve member and coupling part, the second valve member, when the coupling parts are brought together, being held against rotation with respect to the first coupling part, so that continuation of a relative turning movement of the coupling parts, the initial part of which effects interengagement of the said parts, opens and closes the valves.

The invention is hereinafter described with reference to the accompanying drawings, in which:

Figure 2 is a sectional elevation of the coupling shown in Figure 1 with the parts separated;

Figure 7 is a partial section on the line 7—7 of Figure 5;

Figure 8 is a scrap view looking from the right-hand side of Figure 7;

Figure 11 is an elevation, with parts broken away, showing a packing device;

Figure 12 is a radial section through the packing device shown in Figure 11.

Figure 1:
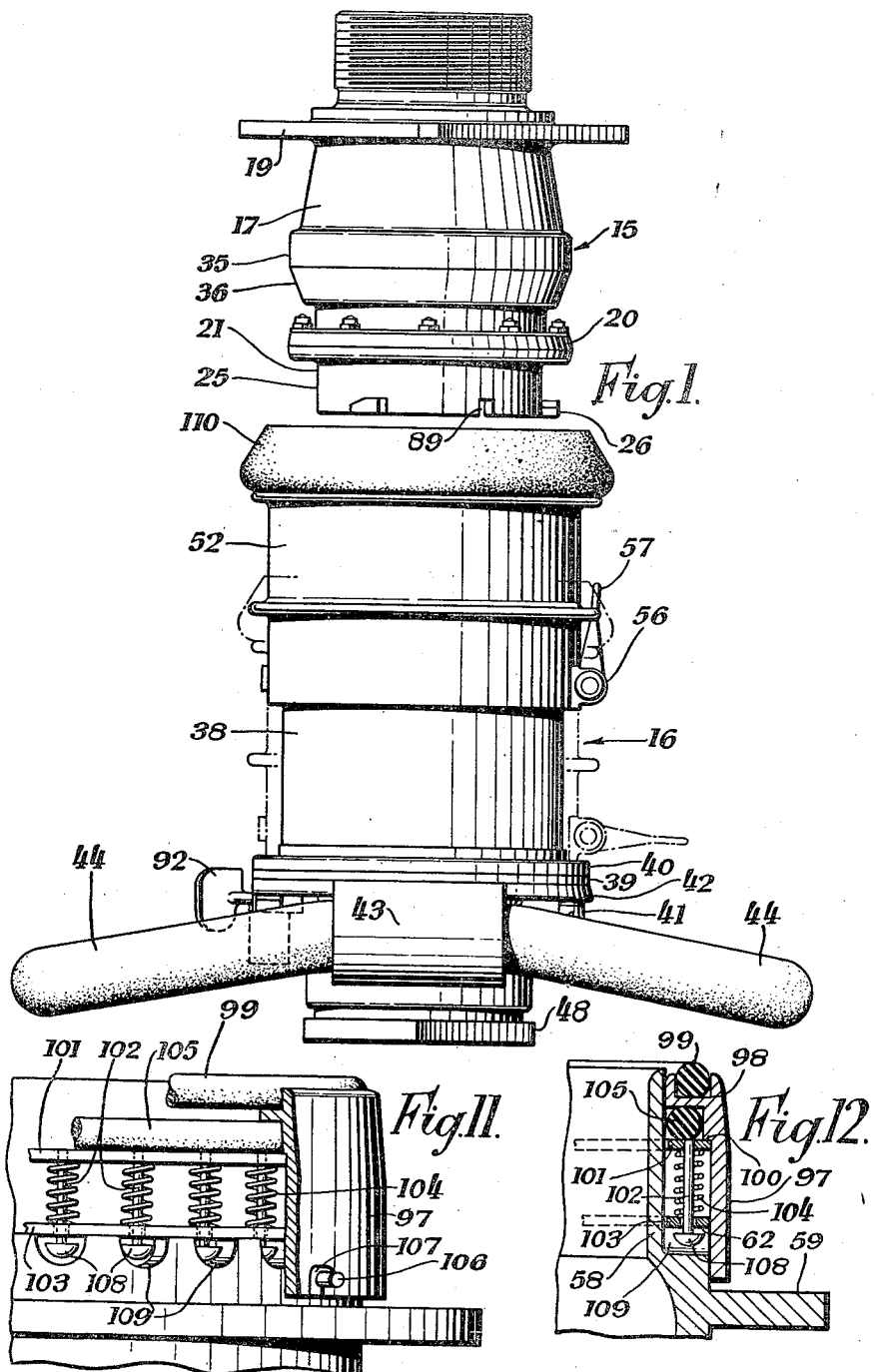
Figure 1 is an elevation of one form of coupling device according to the invention, the parts being separated.

The coupling devices illustrated in the drawings are designed primarily for the connection of aircraft fuel tanks to fuel supply pipes on an aerodrome for refuelling aircraft, a hose being connected at one end by one such coupling to the supply pipe, and at the other end by another similar coupling to the fuel tank to be filled.

Figure 3:
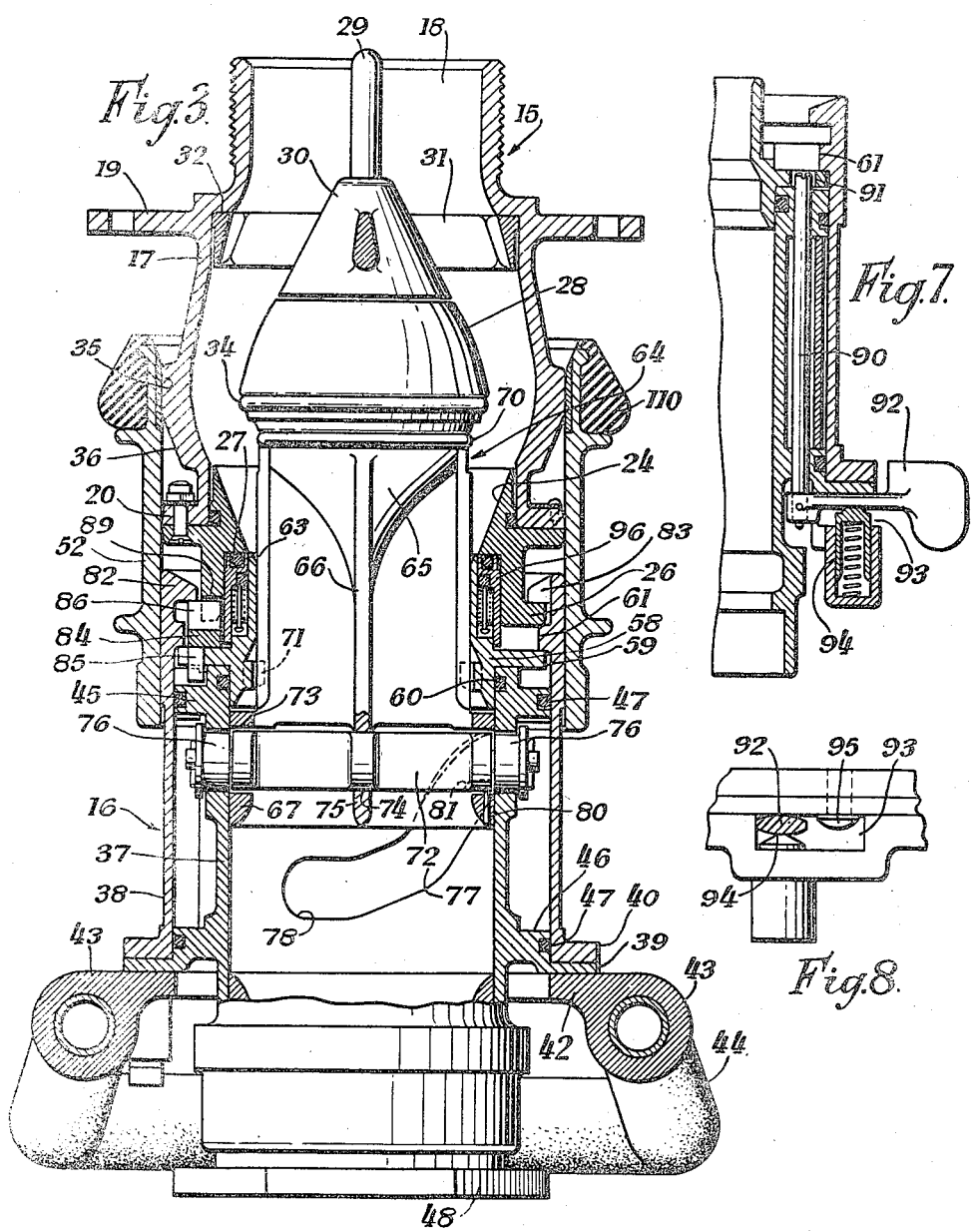
Figure 3 is a sectional elevation of the coupling shown in Figure 1 with the parts coupled together and the valves open.
Figure 4:
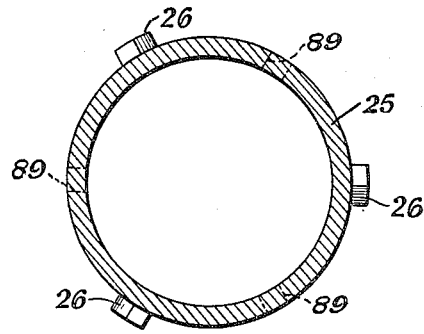
Figure 4 is a section on the line 4—4 of Figure 2.

Referring to Figures 1 to 3 of the drawings, the coupling device shown therein comprises a first part 15 and a second part 16, the first part 15 being that which is mounted on the aircraft and connected to the fuel tanks thereof, or secured to the fixed fuel supply pipe of the aerodrome refuelling system, whilst the part 16 is that which is connected to the hoses. For convenience of description, the ends of the said parts which come together when the parts are coupled are hereinafter termed the inner ends, the other ends being termed the outer ends.

The first coupling part 15 comprises a hollow body 17 having a straight-through passage 18, and having an external fixing flange 19 towards its outer end. A second external flange 20 at the inner end of the body has bolted to it a ring 21 having a portion 22 which enters the passage 18 and carries a packing ring 23 to form a fluid-tight joint therewith, the portion 22 of the ring 21 having a frusto-conical internal surface 24 to provide a valve seat which converges towards the inner end of the said part. The ring 21 also includes a sleeve-like portion 25 formed with three equally spaced external lugs 26, and at the junction of the frusto-conical surface 24 and the sleeve-like portion 25 there is formed a flat shoulder 27 which faces the inner end of the part. A hollow cup-like valve member 28, having a stem 29 guided in a boss 30 supported by a spider 31 which is a sliding fit in the body 17 and bears on a shoulder 32 therein, is urged towards the surface 24 by a spring 33 (Figure 2). The valve member 28 is formed in two parts held together by screws 28$^a$ and clamping between them a packing ring 34 which engages the surface 24 when the valve is closed. The valve member 28 and the boss 30 form together, when the valve is open, as shown in Figure 3, a substantially streamlined unit. The passage 18 in the body is so shaped as to provide a substantially uniform area of the passage when the valve is open.

The edge of the flange 20 is frusto-conical, tapering towards the outer end of the coupling part, and the edge of the ring 21 is also frusto-conical, but tapers in the opposite direction. Between the flanges 19 and 20, the body 17 has a part 35 which has an external diameter equal to the maximum diameter of the flange 20, and a frusto-conical surface 36 leads up to the part 35 on the side nearest the flange 20. As will be described hereinafter, the flange 20 and the part 35 locate the body 17 in the second part of the coupling device, and they provide spaced circumferential locating surfaces the inner one of which makes substantially only a line contact with the second coupling part, whilst the outer one is led smoothly into the second part by the frusto-conical surface 36. This arrangement ensures that the parts can be brought together without jamming even if they are not held in exact alignment.

The second coupling part 16 comprises inner and outer sleeves 37 and 38 bolted together through flanges 39 and 40 formed thereon, the bolts 41 also securing in position a ring 42 formed with two lugs 43, 43 supporting handles 44, 44. The inner sleeve is formed with two spaced circumferential ribs 45 and 46 which engage the inner surface of the outer sleeve, each of the ribs 45 and 46 being grooved to receive a packing ring 47 making a fluid-tight joint with the outer sleeve. A hose adaptor 48 is rotatably mounted in the outer end of the inner sleeve 37, a ring of balls 49 (Figure 2) being housed in opposed grooves in the sleeve 37 and adaptor 48, and a packing ring is provided at 50. The ring of balls 49 provides a thrust bearing which permits relatively free rotation of the sleeve 37 on the adaptor 48 even when a high fluid pressure is acting in the coupling device. The outer end of the adaptor 48 is internally screw-threaded at 51 to receive a screw-threaded hose end fitting.

A guide tube 52 for the coupling part 15 is mounted externally on the outer sleeve 38, the guide tube being of such a diameter internally that the flange 20 and part 35 of the coupling part 15 are an easy fit therein. The guide tube is slidable on the outer sleeve 38, its normal position being that shown in full lines in Figure 1 and in Figures 2 and 3, in which position it is located by an L-shaped fitting 53 shown in Figure 2 and engaging a shoulder 54 on the sleeve 38. The fitting 53 extends inwardly through a hole in the guide tube 52, and is held in place by a grub screw 55. The guide tube 52 can be moved to the position shown in dotted lines in Figure 1, and can be secured in either position by a screw clamp 56 (Figures 1, 2 and 6) which acts on the split outer end of the guide tube, the screw clamp being operated by a handle 57.

A valve seat member 58 is mounted in the inner end of the inner sleeve 37, the valve seat member being tubular and having an external flange 59 intermediate its ends. The flange 59 rests on the end of the sleeve 37, the part of the member 58 on the outer side of the flange being spigotted into the sleeve 37, and passing through a packing ring 60 housed in a groove in the said sleeve. The valve seat member 58 is retained in position axially by an internal rib 61 on the outer sleeve 38, which rib overlaps the inner face of the flange 59. The part of the valve seat member 58 on the inner side of the flange 59 is stepped externally at 62 (see Figure 12), and its extreme end is chamfered internally at 63.

Figure 6:
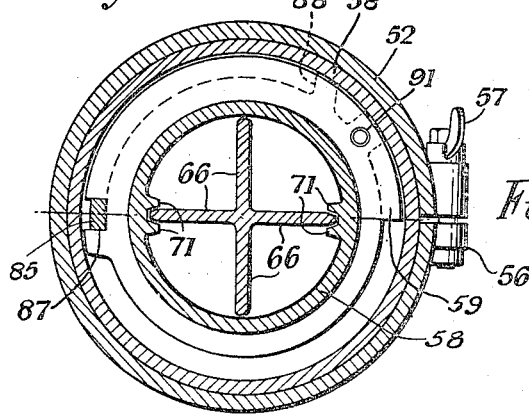
Figure 6 is a composite section, the upper half being on the line 6—6 of Figure 2 and the lower half on the line 6a—6a of Figure 2.

A valve member 64 is slidable in the valve seat member 58, the valve member comprising a conical head 65 which is flat at its inner end, and four radial wings 66 spaced 90° apart as shown in Figure 6, the wings extending towards the outer end of the coupling part 16 and being joined at their outer ends by a skirt 67 which is a sliding fit in the inner sleeve 37. The inner end face of the valve member 64 is formed by a plate 68, separate from the main part of the valve member and secured thereto by screws 69, a packing ring 70, which, when the valve is closed, enters the seat member 58, being clamped between the plate 68 and the body of the valve member. The edge of the plate 68 is chamfered.

Figure 9:
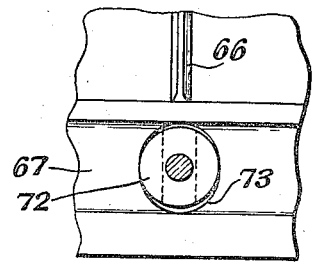
Figure 9 is a detail section on the line 9—9 of Figure 2.
Figure 5:
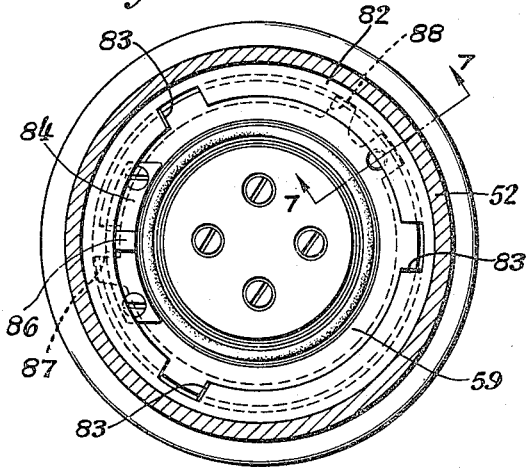
Figure 5 is a section on the line 5—5 of Figure 2.
Figure 10:
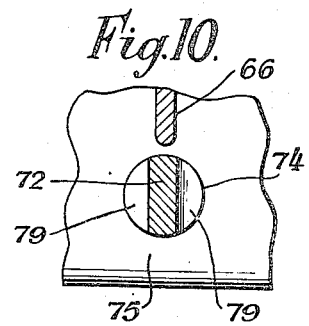
Figure 10 is a detail section on the line 10—10 of Figure 2.

The valve seat member 58 is formed with pairs of inwardly directed lugs 71, 71, two opposed wings 66 on the valve member being each located between one pair of said lugs, so that the valve member 64 and seating member 58 are held against relative rotation. A bar 72 extends diametrically across the valve member 64 through holes 73 in the skirt 67 and a hole 74 in a web 75 formed by an extension of one pair of opposed wings 66, the bar carrying on its ends rollers 76 which engage in cam slots 77 in the inner sleeve 37. The cam slots 77, as shown in Figures 2 and 3, are substantially circumferential at their ends, the circumferential portion 78 at the outer end of each slot being longer than that at the inner end, the slots having intermediate inclined portions which are steeper towards the inner end than adjacent the outer end. The bar 72 has cylindrical portions where it passes through the holes 73 and 74, but its intermediate portions are cut away, as shown at 79 in Figure 10, to reduce the obstruction to flow of fluid. The holes 73 are elongated in the direction of the axis of the coupling, as shown in Figure 9, to permit slight tilting of the bar 72 without causing jamming of the valve member. A peg 80 driven into a hole in the skirt 67 enters a slot 81 in the bar 72 to prevent rotation of the latter. At the inner end of the outer sleeve 38 there is formed an internal flange 82, in which are cut three equally spaced notches 83 (Figure 5) wide enough to permit the passage of the lugs 26 on the coupling part 15. To the flange 59 of the valve seat member 58 there is bolted an arcuate member 84 having a lug 85 which projects through a notch in the flange, and a lug 86 which projects towards the inner end of the coupling part. The lug 85 co-operates with stops 87 and 88 (Figures 5 and 6) formed on the inner face of the rib 45 to limit the angular movement of the valve seat member 58 relative to the sleeves 37 and 38, and the lug 86 provides, with any one of three notches 89 in the sleeve-like portion 23 of the ring 21 on the coupling part 15, a means for interlocking the seat member 58 with the said coupling part 15 to hold them against relative rotation.

In order that the valve member 64 and valve seat member 58 of the coupling part 16 may be locked against rotation relative to the sleeve 37 at various positions of the valve, a latch pin 90 is slidably mounted in the ribs 45 and 46 of the inner sleeve 37 as shown in Figure 7. The latch pin engages with holes such as that shown at 91 in the flange 59 to lock the parts together, and is controlled by an external handle 92 which turns the pin 90 through a small angle, the handle projecting through a slot 93 formed between the flange 39 and the ring 42, by offsetting a portion of the ring 42. At one end of its angular movement the handle engages a spring-loaded stud 94 which tends to force the latch pin 90 to the engaged position, and at the other end of its movement the handle rides on to a fixed stud 95 disposed in the opposite direction to the stud 94, the pin 90 being thus withdrawn and held clear of the holes 91. Figure 8 shows the slot 93 and the studs 94 and 95 as seen from the outside of the coupling.

The valve seat member 58 of the coupling part 16 carries a packing device 96 to provide fluid-tight engagement, when the coupling parts are brought together, with the shoulder 27 on the coupling part 15. This packing device 96 is shown in detail in Figures 11 and 12, to which the following description refers. The packing device comprises a cylindrical metal shell 97 having a thick internal flange at one end, the flange being grooved at 98 to receive a packing ring 99. The shell is shouldered internally at 100, and a washer 101 in which are fixed a number of pins 102 engages the step. The pins pass through a second washer 103, springs 104 being assembled on the pins between the two washers. A second round-section packing ring 105 provided between the washer 101 and the flange of the shell fits closely between the valve seat member and the shell. The end of the shell fits over the step 62 on the valve seat member 58, the packing device being retained in position by pins 106 on the member 58 engaging bayonet slots 107 in the shell, the slots being so formed as to permit limited axial movement of the shell. The pins 102 have heads 108 which limit extension of the springs 104, notches 109 being provided in the step 62 to receive these heads.

When the packing device is mounted on the valve seat member the washer 103 rests on the step 62, and the springs 104, acting through the washer 101, urge the shell 97 inwardly. The packing ring 105, since it fits tightly between the valve seat member and the shell, prevents leakage therebetween. The axial movement of the packing device relative to the valve seat member ensures that any coupling part 15 will make a fluid-tight joint with any coupling part 16 regardless of slight differences in dimensions due to manufacturing tolerances.

When the coupling parts 15 and 16 are separate, the valves in both of them are closed. To couple them together, the coupling part 16 is held by means of the handles 44 and is offered up to the coupling part 15. The latter enters the guide tube 52, the flange 20 entering smoothly into the guide tube even if the two parts are not accurately aligned since the said flange tapers from its inner edge, and thus has substantially only a line contact with the guide tube. The portion 36 of the body of the coupling part 15 leads the guide tube on to the part 35. The lugs 26 engage the inner face of the flange 82, and rotation of the coupling part 16 with slight axial pressure on the latter will cause the lugs to register with, and enter, the notches 83 and engage the rib 61. The coupling part can then be rotated through an angle defined by the stops 87 and 88, the lugs 26 sliding between the flange 83 and the rib 61, and thus locking the parts against axial movement. When the lugs 26 pass through the notches 83 the lug 86 enters one of the notches 89, thus holding the valve seat member 58, and consequently also the valve member 64 against rotation, and the turning of the valve member 16 therefore causes relative angular movement between the valve member 64 and the sleeve 37. The rollers 76 therefore travel along the cam slots 77 from the position shown in Figure 2 to the position shown in Figure 3, causing the valve member 64 to move axially into the coupling part 15, taking with it the valve member 28, and thus opening the passage through the coupling. During the initial part of the turning movement the rollers are moving along the circumferential parts 78 of the cam slots, and no axial movement of the valves takes place, so the lugs 26 are out of register with the notches 83 and the parts are secured together before the valves begin to open. At the end of the valve opening movement the rollers enter the circumferential portions at the other ends of the cam slots, and the spring 25 has therefore no tendency to force the rollers along the cam slots to close the valves. The above-described operations are reversed to separate the coupling parts.

As will be seen from Figure 2, the meeting surfaces of the two coupling parts are substantially flat, and they are arranged to come into contact or to be spaced by only a very small amount when the parts are brought together, so that very little air is entrained when the coupling parts are coupled, and very little liquid is lost when they are separated.

The guide tube 52 carries a rubber ring 110 around its end to protect it from damage and and also to prevent it from damaging anything with which it may come in contact. The guide tube, when moved to the position shown in dotted lines in Figure 1 enables the coupling half 16 to be mated with the appropriate halves of certain other proposed types of coupling device.

Figure 13:
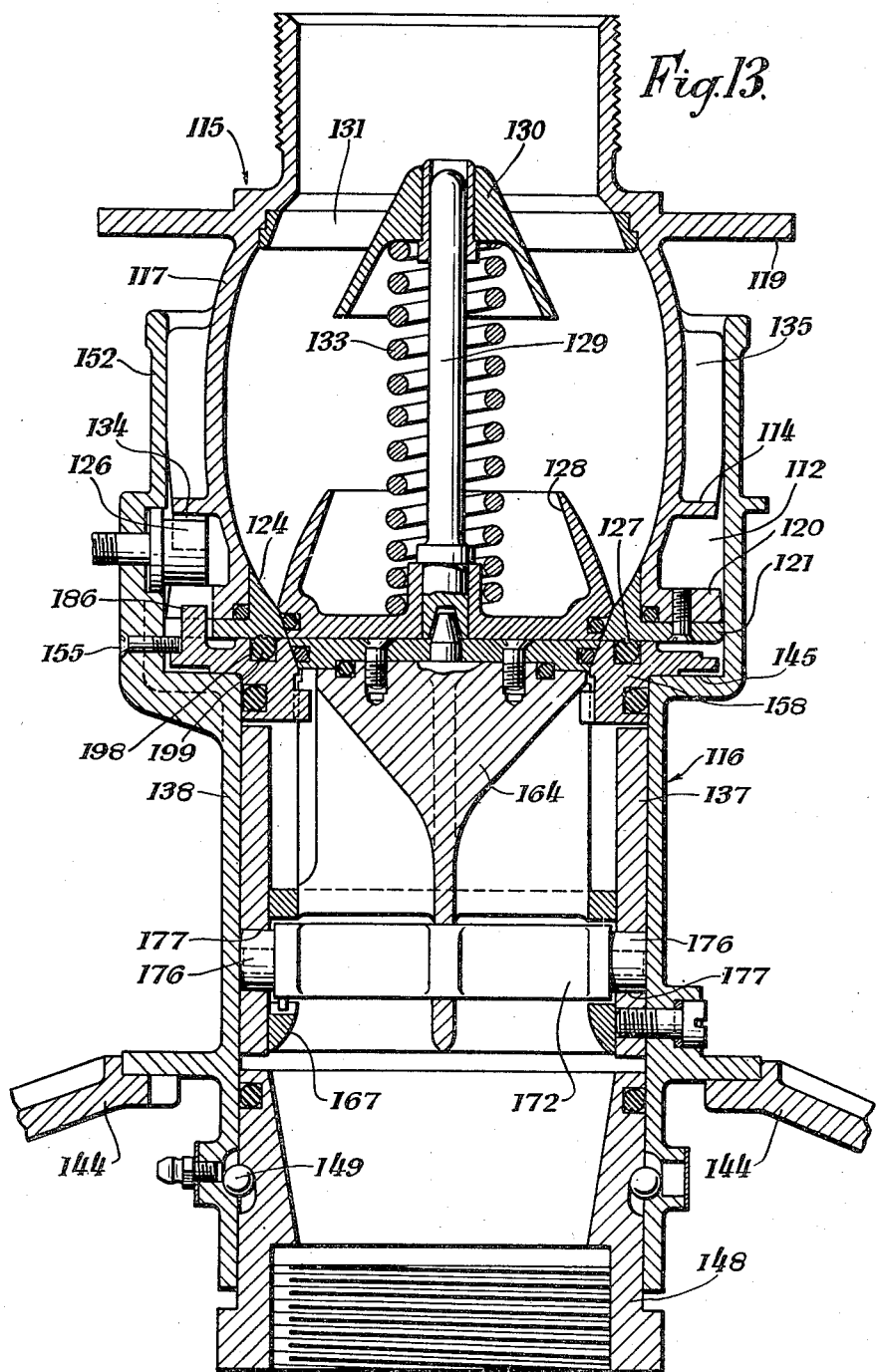
Figure 13 is a sectional elevation of a modified form of coupling according to the invention, the coupling parts being brought together but the valves remaining closed.

The coupling shown in Figure 13 is similar in many respects to that shown in Figures 1 to 12, but differs in a number of details. The figure shows the coupling with the parts brought together but before the valves have commenced to open.

The fixed coupling part 115 has a body 117 generally similar to the body 17 of the coupling part 15, but the ring 121 which forms the valve seat has a flat inner face formed with a small annular rib 127. The ring has a frusto-conical surface 124 forming the seat for the valve member 128, which has a stem 129 guided in a boss 130 integral with a spider 131, and is urged to its closed position by a spring 133. In addition to the fixing flange 119 and an inner end flange 120, the part 115 has an intermediate flange 114 from which wings 135 extend towards the outer end of the coupling part. The flange 120 has a frusto-conical edge as in the previously described example, and the wings 135 taper inwardly to the flange 114, thus providing the same guiding effect as the part 36 of the body of the previously described coupling part 15. The flange 120 is notched at three equally spaced points, as shown at 113. The flanges 114 and 120 define between them a groove 112 which extends right round the coupling part. Ramps 134 are attached to the flange 114 opposite to the notches 113.

The other coupling part 116 comprises a tubular body 138 enlarged at its inner end to form a guide sleeve 152 which receives the coupling part 115, and has rotatably mounted in its other end an adaptor 148 for the attachment of a hose thereto. A ball thrust bearing 149 is provided as in the previous example, and a wheel-like handle, two spokes of which are indicated at 144, is secured to a flange 140 on the body.

A tubular insert 137 is fixed in the body 138, the insert having cam slots 177 similar to the cam slots 77 in the sleeve 37 of the previously described example, rollers 176 being provided on a bar 172 extending through the skirt 167 of a valve member 164, to co-operate with the cam slots. The valve member seats on a valve seat ring 158 resting on a shoulder 145 in the body, and located therein by set screws 155. The valve member 164 is held against rotation in the valve seat ring 158 in the manner previously described.

The guide sleeve 152 carries internally three rollers 126 mounted on radially disposed spindles, and the valve seat ring 158 is formed with axially projecting lugs 186. An annular groove 198 in the valve seat ring 158 houses a round-section packing ring 199, which is held in place by punching the edge of the groove 198 inwardly at spaced points.

When the coupling parts 115 and 116 are brought together, the rollers 126 pass through the notches 113 in the flange 120, and the lugs 186 enter those notches, thus holding the valve seat ring 158 and valve member 164 against rotation with respect to the coupling part 115. Rotation of the coupling part 116 therefore opens the valves as described in connection with the previous example, the rollers running along the groove 112 as the parts are moved relatively to each other. When the parts are uncoupled, the rollers 126 strike the ramps 133, giving an initial separating impulse to the two coupling parts.

The coupling device shown in Figure 13 is provided, as shown in the drawing, with packing rings to ensure fluid-tight joints between the various elements of the respective coupling parts. Specific reference to these packing rings is not considered necessary to provide an adequate understanding of the device.

I claim:

1. A coupling device comprising first and second tubular coupling members having mutually engaged mating ends, mutually co-operative lock means on said members interengaged by relative rotation of said coupling members to hold said ends in mating relation, a valve seat in the mating end of the first coupling member, a valve axially movable in said first coupling member, spring means biasing said valve to engage the said ends in mating relation, a valve seat in the of the second coupling member, a valve axially movable and rotatable in said second coupling member, a ring mounted for rotation in said second coupling member, first interengaging means coupling said ring and the valve in the second coupling member against rotation relative to each other, second interengaging means detachably coupling said ring and said first coupling member against rotation relative to each other, cam and follower mechanism comprising a cam element and a follower element one of which elements is fixed in the second coupling member and the other of which is carried by the valve in said second coupling member, and co-operating axial thrust transmitting surfaces on said two valves, whereby relative rotation of the first and second coupling members causes rotation of the second coupling member relative to the valve in that coupling member to produce relative rotation of the cam and follower elements, and thereby move the valve in the second coupling member axially, the axial movement of the said last mentioned valve being transmitted through the thrust transmitting surfaces to the valve in the first coupling member.

2. A coupling device comprising first and second tubular coupling members having mutually engaged mating ends, mutually co-operative lock means on said members interengaged by relative rotation of said coupling members to hold said ends in mating relation, a valve seat in the mating end of the first coupling member, a valve axially movable in said first coupling member, spring means biasing said valve to engage the said valve seat, a valve axially movable and rotatable in said second coupling member, a valve seat member rotatable in said second coupling member, first interengaging means coupling said valve seat member and the valve in said second coupling member against rotation relative to each other, second interengaging means detachably coupling said seat member and said first coupling member against rotation relative to each other, cam and follower mechanism comprising a cam element and a follower element one of which elements is fixed in the second coupling member and the other of which is carried by the valve in said second coupling member, and co-operating axial thrust transmitting surfaces on said two valves, whereby relative rotation of the first and second coupling members causes rotation of the second coupling member relative to the valve in that coupling member to produce relative rotation of the cam and follower elements and thereby move the valve in the second coupling member axially, the axial movement of the said last mentioned valve being transmitted through the thrust transmitting surfaces to the valve in the first coupling member.

3. A coupling device comprising first and second tubular coupling members having mutually engaged mating ends, mutually co-operative lock means on said members interengaged by relative rotation of said coupling members to hold said ends in mating relation, a valve seat in the mating end of the first coupling member, a valve axially movable in said first coupling member, spring means biasing said valve to engage the said valve seat, a valve seat in the mating end of the second coupling member, a valve axially movable and rotatable in said second coupling member, a ring mounted for rotation in said second coupling member, first interengaging means coupling said ring and the valve in the second coupling member against rotation relative to each other, second interengaging means detachably coupling said ring and said first coupling member against rotation relative to each other, a cam element fixedly mounted in said second coupling member, a follower element mounted on the valve in the second coupling member, and co-operating axial thrust transmitting surfaces on said two valves, whereby relative rotation of the first and second coupling members causes rotation of the second coupling member relative to the valve in that coupling member to produce relative rotation of the cam and follower elements and thereby move the valve in the second coupling member axially, the axial movement of the said last mentioned valve being transmitted through the thrust transmitting surfaces to the valve in the first coupling member.

4. A coupling member for a coupling device, comprising a body, a valve seat in said body, a valve rotatable in said body and axially slidable towards and away from said seat, a cam element and a follower element, said follower element being movable axially by rotation relative to said cam element, said valve carrying one of said elements, means fixing the other of said elements to said body, a ring mounted for rotation in said body, interengaging means coupling said ring and said valve against rotation relative to each other but permitting axial movement of said valve, and means on said ring to engage a mating coupling member and hold said ring against rotation.

5. A coupling member for a coupling device, comprising a body, a valve seat member rotatable in said body, a valve rotatable in said body and axially slidable towards and away from a seat on said valve seat member, a cam element and a follower element, said follower element being movable axially by rotation relative to said cam element, said valve carrying one of said elements, means fixing the other of said elements to said body, interengaging means coupling said valve seat member and said valve against rotation relative to each other but permitting axial movement of said valve, means on said valve seat member to engage a mating coupling member and hold said valve seat member against rotation, and an axial thrust transmitting surface on said valve to engage a valve in said mating coupling member.

6. A coupling member as set forth in claim 4 wherein said valve comprises an axial thrust transmitting surface for engaging a valve in a mating coupling member.

7. A coupling member as set forth in claim 4 comprising a sealing member resiliently mounted on and surrounding said valve seat for engagement with a mating coupling member.

JOHN FRASER.

References Cited in the file of this patent

UNITED STATES PATENTS

| Number | Name | Date |
| --- | --- | --- |
| 2,048,936 | Kremser | July 28, 1936 |
| 2,393,489 | Trautman | Jan. 22, 1949 |
| 2,471,798 | Thomas | May 31, 1949 |
| 2,519,358 | Davis | Aug. 22, 1950 |
| 2,543,590 | Swank | Feb. 27, 1951 |

FOREIGN PATENTS

| Number | Country | Date |
| --- | --- | --- |
| 854,220 | France | Jan. 4, 1940 |
| 859,331 | France | June 3, 1940 |